US006542622B1

(12) United States Patent
Nelson et al.

(10) Patent No.: US 6,542,622 B1
(45) Date of Patent: Apr. 1, 2003

(54) METHODS AND ARTICLES FOR DETERMINING INVISIBLE INK PRINT QUALITY

(75) Inventors: David J. Nelson, Rochester, NY (US); Kevin W. Williams, Rochester, NY (US); Robert C. Bryant, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/385,608

(22) Filed: Aug. 30, 1999

(51) Int. Cl.[7] ................................................ G06K 9/00

(52) U.S. Cl. ...................... 382/112; 235/468; 250/271; 283/72; 356/71

(58) Field of Search ................................ 382/100, 112, 382/141, 199, 232; 106/31.29; 156/277; 235/469, 468; 250/271; 283/109, 67, 72, 83; 347/15; 356/71; 358/1.13, 1.9, 475; 380/54; 399/366

(56) References Cited

U.S. PATENT DOCUMENTS

| | | | | |
|---|---|---|---|---|
| 4,033,059 A | * | 7/1977 | Hutton et al. | 40/137 |
| 4,455,039 A | * | 6/1984 | Weitzen et al. | 283/83 |
| 4,675,696 A | | 6/1987 | Suzuki | |
| 4,869,532 A | | 9/1989 | Abe et al. | |

(List continued on next page.)

FOREIGN PATENT DOCUMENTS

| | | |
|---|---|---|
| EP | WO 85/01476 | 4/1985 |
| EP | 0 803 368 A1 | 10/1997 |
| JP | 04247457 | 3/1992 |

*Primary Examiner*—Jayanti K. Patel

(57) ABSTRACT

A test target having N invisible test data encodements ($66_0$–$66_N$, $74_0$–$74_N$, $74'_0$–$74'_N$) each comprising test data printed over the surface of test print media media in a defined spatial order printed in invisible ink by a printer under test. The invisible ink print quality of the printer is determined by the ability of an invisible encodement reader to decode certain of the N invisible encodements ($66_0$–$66_N$, $74_0$–$74_N$, $74'_0$–$74'_N$). In a first preferred embodiment, a test print media is prepared by pre-printing or coating a media surface with an invisible ink that is sensitive to the same wavelength of light as the printer ink in a plurality N of areas on the media surface providing step background densities ($58_0$–$58_N$) ranging from no applied ink to maximum printer ink density in a test tablet manner In the test mode, N test data files are printed as N invisible encodements ($66_0$–$66_N$) in the corresponding N areas ($58_0$–$58_N$) thereby creating a test target that is to be read by the reader. It is presumed that the print quality that the printer is capable of achieving is degraded if fewer than a predetermined number of encodements ($66_0$–$66_N$) are readable, and the invisible ink is replaced or replenished. In a second preferred embodiment, the test target comprises N invisible encodements ($74_0$–$74_N$, $74'_0$–$74'_N$) differing from one another in a step tablet manner printed by the printer (16) under test. The encodements ($74_0$–$74_N$, $74'_0$–$74'_N$) are read and decoded to the extent possible using the reader. The particular ones of the encodements ($74_0$–$74_N$, $74'_0$–$74'_N$) that can be accurately decoded provide a measure of the print quality that the printer is capable of achieving.

37 Claims, 8 Drawing Sheets

U.S. PATENT DOCUMENTS

| | | | | | |
|---|---|---|---|---|---|
| 4,889,979 | A | | 12/1989 | Drexler et al. | |
| 4,983,817 | A | | 1/1991 | Dolash et al. | |
| 5,059,126 | A | | 10/1991 | Kimball | |
| 5,093,147 | A | | 3/1992 | Andrus et al. | |
| 5,146,087 | A | * | 9/1992 | VanDusen | 250/271 |
| 5,276,472 | A | | 1/1994 | Bell et al. | |
| 5,286,286 | A | | 2/1994 | Winnik et al. | |
| 5,313,235 | A | | 5/1994 | Inoue et al. | |
| 5,314,336 | A | | 5/1994 | Diamond et al. | |
| 5,333,069 | A | * | 7/1994 | Spence | 358/517 |
| 5,369,261 | A | | 11/1994 | Shamir | |
| 5,418,855 | A | * | 5/1995 | Liang et al. | 380/23 |
| 5,450,165 | A | * | 9/1995 | Henderson | 355/208 |
| 5,478,997 | A | | 12/1995 | Bridelall et al. | |
| 5,503,904 | A | * | 4/1996 | Yoshinaga et al. | 428/195 |
| 5,516,590 | A | | 5/1996 | Olmstead et al. | |
| 5,525,798 | A | | 6/1996 | Berson et al. | |
| 5,541,633 | A | | 7/1996 | Francoise et al. | |
| 5,547,501 | A | | 8/1996 | Maruyama et al. | |
| 5,569,317 | A | | 10/1996 | Thyagaraj et al. | |
| 5,583,331 | A | | 12/1996 | Dvorkis | |
| 5,591,956 | A | | 1/1997 | Longacre, Jr. et al. | |
| 5,684,069 | A | | 11/1997 | Auslander | |
| 5,693,693 | A | | 12/1997 | Auslander et al. | |
| 5,695,918 | A | | 12/1997 | Gray et al. | |
| 5,755,860 | A | | 5/1998 | Zho | |
| 5,766,324 | A | | 6/1998 | Ikegawa et al. | |
| 5,822,436 | A | | 10/1998 | Rhoads | |
| 5,854,478 | A | | 12/1998 | Liu et al. | |
| 5,861,618 | A | | 1/1999 | Berson | |
| 5,980,016 | A | * | 11/1999 | Nelson et al. | 347/19 |
| 6,094,279 | A | * | 7/2000 | Soscia | 358/1.9 |
| 6,322,192 | B1 | * | 11/2001 | Walker | 347/19 |

* cited by examiner

METHODS AND ARTICLES FOR DETERMINING INVISIBLE INK PRINT QUALITY

CROSS REFERENCE TO RELATED APPLICATIONS

Reference is made to commonly assigned co-pending U.S. Patent Applications which are all incorporated herein by reference:

- Ser. No. 09/122,502, filed Jul. 24, 1998 now U.S. Pat. No. 6,191,406, entitled DATA READER AND READER SYSTEM HAVING VISIBLE CENTERLESS TARGETING, and filed in the names of David J. Nelson, Robert C. Bryant, and Carl F. Leidig;
- Ser. No. 09/121,907, filed Jul. 24, 1998 now abandoned, entitled ANGLED TARGETING DATA READER AND READING SYSTEM, and filed in the names of Carl F. Leidig, David J. Nelson, and Robert C. Bryant;
- Ser. No. 09/223,859, filed Dec. 31, 1998, entitled ARTICLE AND METHOD FOR STORAGE OF DATA, and filed in the names of Kevin W. Williams and Huijan D. Chen;
- Ser. No. 08/931,575, filed Sep. 16, 1997, entitled METHOD AND APPARATUS FOR PRODUCING IMAGE PRINTS WITH VARIABLE DATA ENCODEMENT, and filed in the names of Peter P. Soscia, Jeffrey Alan Small, and Thomas C. Reiter;
- Ser. No. 08/959,036, filed Oct. 28, 1997 now U.S. Pat. No. 6,094,379, entitled SYSTEM AND PROCESS FOR NON-PERCEPTIBLY INTEGRATING SOUND DATA INTO A PRINTED IMAGE, and filed in the name of Peter P. Soscia;
- Ser. No. 09/097,975, filed Jun. 16, 1998, entitled DATA-READING IMAGE CAPTURE APPARATUS, CAMERA, AND METHOD OF USE and filed in the names of Robert C. Bryant, David J. Nelson, and Jeffrey A.
- Ser. No. 09/128,881, filed Aug. 4, 1998 now U.S. Pat. No. 6,184,534, entitled METHOD OF PULSING LIGHT EMITTING DIODES FOR READING FLUORESCENT INDICIA, DATA READER, AND SYSTEM, and filed in the names of Thomas M. Stephany, Bryan D. Bernardi, Robert C. Bryant, David J. Nelson;
- Ser. No. 09/335,417 filed Jun. 17, 1999, entitled ARTICLES BEARING INVISIBLE ENCODEMENTS ON CURVED SURFACES, and filed in the name of David J. Nelson.

FIELD OF THE INVENTION

The invention relates to methods and articles for determining print quality of an invisible ink encodement recorded by a printer on media, particularly a test print recorded in invisible ink or dye by a printer, to enable a user to determine if the ink or dye is depleted or the printer is operating improperly.

BACKGROUND OF THE INVENTION

It is well known to imprint data on various articles and objects, including printed media, labels, containers, vehicles, etc., in the form of a machine readable, code or "symbology" that is visible to the eye but requires a reader to read and decode. The terms "symbology" or "symbologies" are generally employed to denote spatial patterns of symbology elements or marks, wherein each mark has a shape and separated from an adjacent mark by a spacing between the marks, whereby information is encoded in the shapes and/or the spacings between the marks, and embrace bar codes and other codes as described further below. Typically the decoded information output by the reader is used by a machine in a process of identification of the article and to associate it with other data, e.g. unit price and restocking code, which may be displayed and printed out. A great many symbologies and specialized symbology readers have been adopted over the years.

It is also known to encode aural information as such machine readable bar codes associated with images on media so that the aural information or sound can be reproduced from the encoded symbology. Such systems are shown, for example, in U.S. Pat. Nos. 5,276,472 and 5,313,235 in relation to photographic prints, and in U.S. Pat. Nos. 5,059,126 and 5,314,336 in relation to other objects or printed images.

Furthermore, it is well known to record or print symbologies or human recognizable images on various media, e.g., documents, identity cards, financial instruments, professional photographic prints, etc., to verify identity or inhibit unauthorized use or copying, and on stamps and envelopes in postal cancellation applications. Such printing is typically done with one or more invisible ink or dye imprinted on the surface of the document or incorporated into internal layers of the media. These symbologies or recognizable images are normally invisible but can be made visible to and read by a scanner or reader when illuminated by a specific light wavelength or band, e.g. infrared and ultraviolet wavelengths. Such symbologies or images are intended to be permanently recorded or printed onto or incorporated within the media and to be tamper resistant.

The above-referenced, commonly assigned and pending patent applications disclose encoding "variable data" in conformance with a known symbology and printing it as an invisible "encodement" located in an image field on media on a photographic print image or a print that is produced by other means. One disclosed use of such invisible encodements constitutes printing the invisible encodements over or with a visual print image at the time that prints are made from filmstrip image frames. Typically, such prints would be made for consumers (hereafter referred to as users) from such filmstrips by photofinishers. In this context, the term "variable data" includes data that varies from print to print and contains information typically related to the visible print image. The "encodement" is preferably encoded and printed using a two-dimensional symbology that is relatively dense and is at least co-extensive in area with the visible photographic image to maximize the amount of sound information that can be recorded.

The encodement is invisible or substantially invisible to the human eye when viewed under normal viewing conditions, that is, facing the viewer and under sunlight or normal room illumination such as incandescent lighting. This ensures that the encodement does not materially degrade the visible print image. A number of encodement materials and encodement printing techniques are disclosed in the above-referenced commonly assigned and pending patent applications. It is contemplated that the preferred encodement materials would be infrared absorbing inks or dyes imprinted onto the visible print image using thermal dye transfer printing or inkjet or laser printing techniques or the like.

But, it is also contemplated that the user may alternatively generate variable data and print such invisible encodements over a visible print image using computer based printer systems of the types disclosed in the above-incorporated U.S. patent application Ser. Nos. 08/931,575, and 09/356,956. In this context, users may also generate the variable data and visible image data from a variety of sources and print them on print media.

For example, digital cameras are available for use by such users that capture digital image data when used and also have the capability of recording user input sound information and camera input exposure information at the time the image is captured by the user. Software implemented typically in a personal computer is employed to process the digital image data and display the images on a monitor for editing and to make permanent prints of such digitally captured images employing inkjet or laser color printers or thermal dye transfer printers.

The user that receives such a print with the invisible encodement made by a photofinisher or that prints an encodement onto visible print image would employ a playback unit to capture the encodement and reproduce or play back the sound or display the visual information or otherwise use the variable data of the encodement. The above-incorporated U.S. patent application Ser. Nos. 08/931,575, and 09/356,956 also disclose systems for reading encodements of this type. During reading, the invisible encodement image is illuminated with light having a wavelength that causes the invisible dye to absorb or reflect the light or to fluoresce in contrast to the background of the media. The illuminated encodement image is captured by a planar imager, e.g. a CCD or CMOS array imager of a hand held reader or a stationary reader or scanner. The variable data of the captured encodement image is decoded and played back as sound through various sound reproduction systems or displayed in visible form to be read by the user.

The user that records an invisible encodement using such a user operated printer has no way of knowing whether the ink or dye is being printed on the print media because it is invisible to the eye. The invisible encodement may be entirely missing or so badly or faintly printed that it cannot be accurately read. The invisible ink or laser toner or thermal dye transfer media may become exhausted or the cartridge or printing head may otherwise become defective and smear or erratically print symbology elements of the encodemnent. After the invisible encodement is printed, it is possible to employ the scanner or reader to determine if the encodement can be read. But, even if the encodement can be read, there is no simple or inexpensive way to determine if the print quality of the encodement is high enough to avoid deterioration over time due to ink or dye fading or to allow a certain amount of handling of the print, for example, and still allow successful reading of the encodement. If the encodement print quality is so poor that errors are detected when it is read, it is difficult to remove the encodement or to reprint the encodement using a new ink cartridge or dye transfer media over the existing encodement due to possible misalignment of the print media during such reprinting.

There is a need for inexpensive and simple methods and articles that enable the user to determine the invisible ink print quality that the printer is capable of providing before or following printing of a desired invisible encodement on the print media.

SUMMARY OF THE INVENTION

The invention is defined by the claims. The invention, in its broader aspects, provides: (1) a test target having a plurality of invisible encodements each comprising test data printed over a test print media in a defined spatial order by the printer under test, wherein the print quality of the printer is determined by the ability of the reader to decode the plurality of invisible encodements; and (2) methods of generating and reading the test target.

The invention may be practiced employing any printer technology capable of printing invisible encodements including but not limited to thermal dye transfer printers, inkjet printers, laser printers and the like. For purposes of simplifying the description and claims, the term "ink" will be employed herein to embrace inks, dyes, toners and the like that can be employed in printing invisible encodements as described above.

In a first preferred embodiment, a test print media is prepared by pre-printing or coating a media surface with an invisible ink that is sensitive to the same wavelength of light as the printer ink in a plurality of densities in a plurality N of spaced apart areas of the media surface providing step background densities in a test tablet manner. The background densities range from no applied ink to maximum printer ink density in N increments. In the test mode, N test data files are printed as N invisible encodements in the corresponding N areas of the test print media all at the same maximum print density that the printer is capable of providing, thereby creating a test target that is to be read by the reader. Because of a difference in contrast, a predetermined number of the encodements at defined locations where the density of the encodement exceeds the step densities by a certain amount are readable if the print quality is less than maximum print quality. The particular ones of the encodements that can be accurately decoded provide a measure of the print quality that the printer is capable of achieving. It is presumed that the print quality that the printer is capable of achieving is degraded if fewer than the predetermined number of encodements are readable, and the invisible ink is replaced or replenished.

In a second preferred embodiment, the test target comprises a plurality of encodements differing from one another in a step tablet manner printed by the printer under test on test print media that can comprise plain paper or paper or prints bearing visible images that can be sacrificed. Each of the encodements is read and decoded to the extent possible using the reader. The particular ones of the encodements that can be accurately decoded provide a measure of the print quality that the printer is capable of achieving.

In one variation of this embodiment, a series of test data files are printed with varying degrees of symbology element intensity or density of applied invisible ink by a gray scale print mode program installed in the computer controlling the printer in question. In the test mode, the test data files are thereby printed as a plurality of progressively degraded or more faded invisible encodements at a corresponding plurality of discrete locations of the test print media thereby creating a test target that is to be read by the reader. At maximum print quality, a predetermined number of the encodements at defined locations are readable despite the imposed degradation of print quality. Additional physical corruption of the encodements occurs if print quality is reduced from maximum print quality. Again, it is presumed that the print quality that the printer is capable of achieving is degraded if fewer than the predetermined number of encodements are readable or a predetermined encodement is not readable.

In a further variation of this embodiment, a series of test data files are created with varying amounts of corrupted data by a test program installed in the computer controlling the printer in question. In the test mode, the test data files are printed as a plurality of invisible encodements at a corresponding plurality of discrete locations of the test print media thereby creating a test target that is to be read by the reader. Given that redundancy is built into the encoding, a predetermined number of the encodements at defined locations are readable despite the imposed corruption at maximum print quality. Additional physical corruption of the encodements occurs if print quality is degraded from maximum print quality. Again, if fewer than the predetermined number of encodements are readable, it is presumed that the print quality that the printer is capable of achieving is degraded.

In a still further variation of this embodiment, a series of test data files are printed as invisible ink encodements with varying degrees of symbology element resolution, including element size and spacing, by a resolution changing program installed in the computer controlling the printer in question. In the test mode, the test data files are thereby printed as a plurality of progressively higher resolution invisible encodements at a corresponding plurality of discrete locations of the test print media thereby creating a test target that is to be read by the reader. At maximum print quality, a predetermined number of the encodements at defined locations are readable despite the sequential increase in resolution. Physical corruption of the encodements occurs if print quality is reduced from maximum print quality. Again, it is presumed that the print quality that the printer is capable of achieving is degraded if fewer than the predetermined number of encodements are readable or a predetermined encodement is not readable.

In each embodiment, the user can use the reader to capture each encodement, and the user is advised if the reader can decode the encodement audibly and/or visually. The audible or visual message that is encoded in each encodement that can be read advises the user of print quality and preferably constitutes the statement of the quality of the printer which can also be printed visibly on the test target in physical association with the encodements.

The use of such test print media and the methods of printing and reading the same provide the user with simple and inexpensive ways to gauge the invisible ink print quality in advance of printing an invisible encodement. A new ink container or source or other corrections of the printer can be pursued if the test reveals that print quality is degraded. The invention provides a high degree of flexibility and choice in printing invisible encodements on a visible print or on other media.

BRIEF DESCRIPTION OF THE DRAWINGS

The above-mentioned and other features and advantages of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
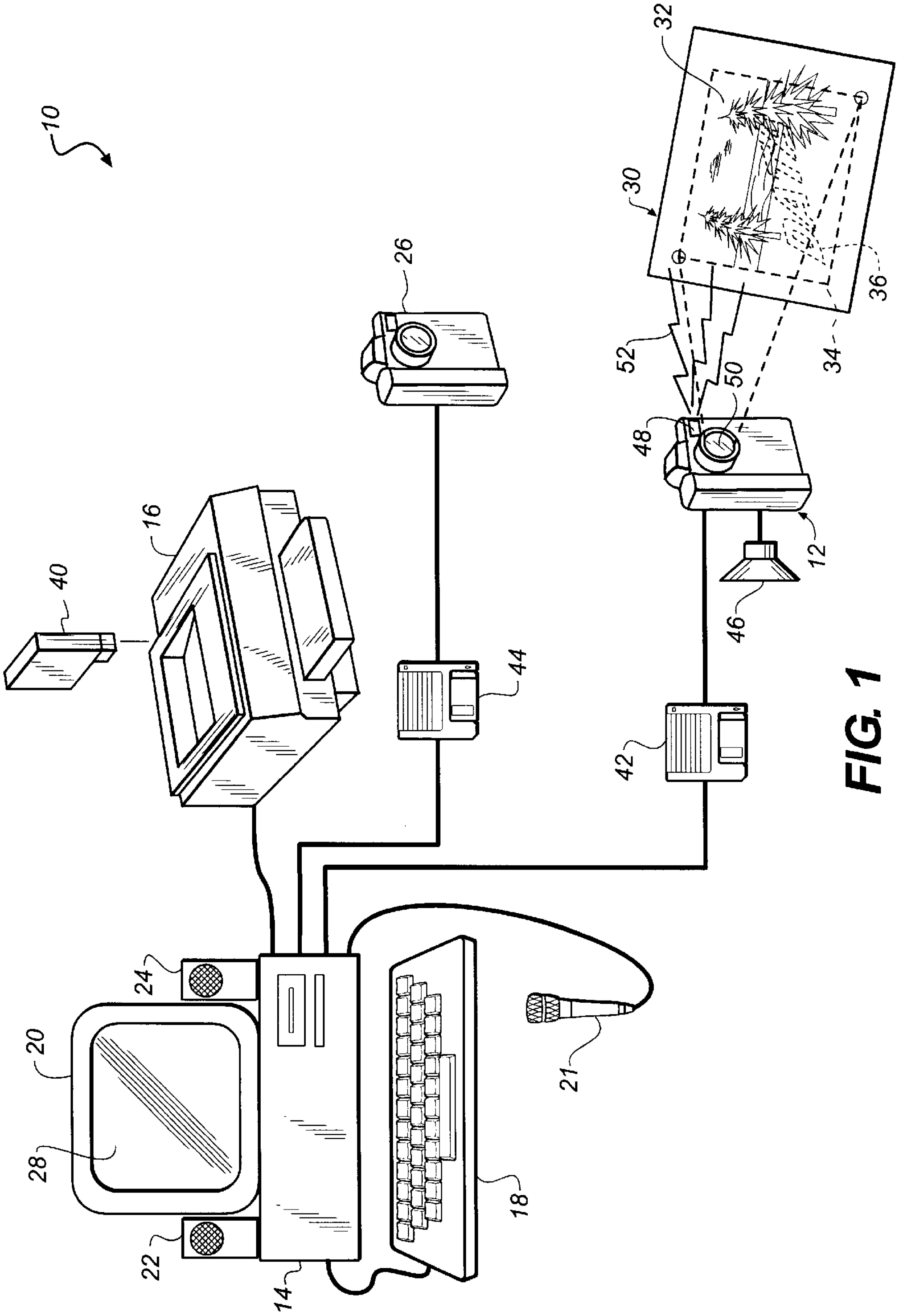
FIG. 1 is a schematic illustration of the system employed by a user to read or to print one or a plurality of invisible encodements on prints that are either received from a photofinisher or are otherwise acquired by or made by the user operating the system.

The alternative embodiments of the present invention can be practiced employing certain components of a user controlled system 10 of the general type shown in FIG. 1 and a test target created with the printer under test employing the test print media of the first embodiment or plain paper in the second embodiment. Attention is therefore directed to the user system 10 of FIG. 1 and to the parts of that system that can be employed in generating and using test print media and in practicing the various methods of the invention depicted in the remaining figures. In FIG. 1, a comprehensive user system 10 comprises a hand held reader 12, a computer 14 that is coupled to a printer 16, a keyboard 18, a monitor 20, a microphone 21, and computer controlled audio speakers 22 and 24 in the conventional manner, and a printer recording medium or container 40 containing at least one invisible print material for printing invisible encodements. The user system 10 optionally can also include a digital camera 26 for capturing visible images as digital image data files 44 that are displayed on the monitor screen 28 and printed as prints by printer 16 along with a first recorded invisible encodement. The computer 14, printer 16, keyboard 18, monitor 20, microphone 21, and computer controlled audio speakers 22 and 24 and their interconnections can take the form of any personal computer system or a commercially installed kiosk computer system operating with known operating systems and software. Certain aspects of the present invention involving use of these components to display or play back the data files generated by the hand held reader 12 capturing and reading invisible encodements on print media 30 or to compose and print an invisible encodement using printer 16 and invisible printing material contained in container 40 are described in detail below.

The digital camera 26 is preferably a conventional one of the KODAK digital science® cameras capable of user input sound and camera exposure data recording that can be interfaced with the computer 14 for audio and video reproduction and for making visible prints of images captured by the digital camera 26. For example, the digital camera 26 can be the Model 420/460 Color Infrared (CIR) cameras having sound recording capability and removable PCMCIA-ATA storage media that can be coupled to the computer 14 by a PCMCIA slot adapter. The digital camera 26 can also be combined with the hand held reader 12 according to the teachings of the above-incorporated patent application Ser. No. 09/097,975. Therefore, it will be understood that the following descriptions of the uses and operations of the digital camera 26 and the hand held reader 12 can apply to separate or combined components.

The print media 30 depicts a visible image 34 and an invisible encodement 36 (illustrated as "DATA") overlying the visible image 34 and printed on the printed surface 32. The present invention contemplates use of a relatively simple bar code symbology or preferably use of more sophisticated, two-dimensional symbologies using symbology elements that have been developed or will be developed to format the invisible encodement 36. The two-dimensional symbologies maximize the amount of information that can be encoded within the image field and any other available surface of the object that can be imaged by a planar imager while imaging the visible image in the image field. Bar code symbols are formed from bars or elements that are typically rectangular in shape with a variety of possible widths. The specific arrangement of elements defines the character represented according to a set of rules and definitions specified by the code or symbology used. The relative widths of the bars and the spaces between the adjacent bars is determined by the type of coding used, as is the actual size of the bars and spaces. The number of characters per inch represented by the bar code symbol is referred to as the density of the symbol. To encode a desired sequence of characters, a collection of element arrangements are concatenated together to form the complete bar code symbol, with each character of the message being represented by its own corresponding group of elements. In some symbologies a unique "start" and "stop" character is used to indicate where the bar code begins and ends. A number of different bar code symbologies exist including UPC/EAN, Code 39, Code 49, Code 128, Codabar, Interleaved 2 of 5, and PDF 417 used by Symbol Technologies, Inc., of Holtsville, N.Y. Alternatively, the encodement scheme marketed as "PaperDisk" by Cobblestone Software, Inc., of Lexington, Mass. may be employed.

The "PaperDisk" software may be installed in the memory of computer 14 to enable the user to compose a data file and to operate the printer 16 to print the symbology as an encodement on any media that the printer is capable of printing on. The printer 16 can print the encodement using printer drivers of the software, and can print it as an invisible encodement using the invisible print material in container 40. Similarly, the software can be employed to decode a data file 42 generated by hand held imager 12 as described below and to display, audibly play it back or print it out in a visible, decoded print form.

The invisible encodement 36 is preferably recorded or printed as an invisible layer of such symbology elements that can be made visible to a planar imager (not shown) within hand held reader 12 when it is illuminated by emitted light beam 52 with radiation in a band outside the visible spectrum. The radiation is modulated by the symbology elements, e.g., by absorption, reflection, transmission, or luminance, and the modulated image is captured and read by a planar imager within hand held reader 12. See U.S. Pat. Nos. 5,093,147; 5,286,286; 5,516,590; 5,541,633; 5,684,069; 5,755,860; and 5,766,324 for examples of differing dyes or inks that may be selected for thermal dye transfer printing or inkjet printing and which either absorb a selected impinging light wavelength or fluoresce in response to the impinging light radiation of emitted light beam 52.

As noted above, the invisible inks used to imprint the invisible symbology elements of the invisible encodement 36 preferably are infrared absorbing inks contained in container 40. In the practice of the present invention, the selected dye must be capable of being formulated for use in thermal dye transfer printing sheet media or in laser toner or in inkjet cartridges typically used in consumer use printers 16. For example, an 880 nm or 1000 nm sensitive ink in container 40 can be used for printing the invisible encodement 36 using printer 16 and as the bandwidth of the emitted light beam 52. Examples of suitable infrared colorants and ink compositions are disclosed in U.S. patent application Ser. No. 09,223,859, filed Dec. 31, 1998, entitled ARTICLE AND METHOD FOR STORAGE OF DATA. A particularly suitable colorant that absorbs strongly at 880 nm is heptamethine benzindolenine cyanine dye prepared according to the procedure described in U.S. Pat. No. 5,695,918, which is hereby incorporated herein by reference. This dye can be easily dispersed or dissolved in solvents used in the preparation of printing ink and is stable in the printing ink.

The hand held reader 12 therefore provides the capability of capturing each invisible encodement 36 when it is illuminated by the emitted light beam 52, decoding the symbology of the encodement into a data file, decompressing it, converting it to analog audio signals and playing it back as sound through the built in amplifier and speaker 46. In addition, it is capable of transmitting the encodement image data file 42 to the computer 14 by way of a direct port connection or the diskette or PCMCIA card or by IR or RF data transmission. The hand held reader 12 includes the light source 48 for illuminating the printed surface 32 with the impinging light beam 52 having the selected invisible light wavelength that is absorbed by the invisible encodement 36. The higher intensity reflected light between symbology elements is focused through the image capture lens 50 on an internal planar imager (not shown) that is sensitive to the reflected invisible light wavelength to provide an image of the symbology elements.

The above-incorporated patent application Ser. No. 08/931,575 discloses systems for reading encodements of this type. The illuminated invisible encodement image is captured by a planar CCD or CMOS array imager, and decoded and played back as sound through various sound reproduction systems or displayed on monitor screen 28. During reading, it is necessary to locate the planar imager generally parallel with the image field and generally in alignment with a central point of the image field or visible print in order to image the encodement and capture and decode the symbology accurately. Otherwise, part of the invisible encodement 36 will not be imaged by the planar imager through image capture lens 50 and/or the symbology will be distorted if the image field plane is skewed to the plane of the planar imager.

Although it is referred to herein as "hand held", it will be understood that hand holding of the hand held reader 12 is a convenience but is not necessary to the practice of the present invention. The hand held reader 12 can be permanently or temporarily mounted to a support in actual use. Or, in a computer-based system, all of the components of the hand held reader 12 could be incorporated into a flat bed or paper feed type desktop scanner or even in such scanning capabilities incorporated into the printer 16.

To recapitulate, it will be understood that printer 16 can take any form capable of printing the invisible encodements on media, e.g., photographic prints, print quality paper, or plain paper or the like and on objects, and presently includes laser printers, inkjet printers, thermal dye transfer printers, etc., and container 40 represents a source, e.g. a laser toner or inkjet cartridge or thermal dye transfer donor media. The nature, content, and manner of production of the print media 30 and the visible image 34 and the invisible encodement 36 produced by a source other than the user of the system of FIG. 1 is not critical to the present invention. The visible image 34 is printed information that can be seen by the user under ordinary visible wavelength light conditions, in the form of pictorial information, text or other alphanumeric information, or non-alphanumeric indicia. However, the symbology elements of the invisible encodement 36 are each recorded or printed using materials that are outside the visible spectrum. The user therefore cannot tell if the invisible encodement 36 that is printed by printer 16 is printed at maximal print quality or is printed at a lower print quality. In order to read any invisible encodement 36, the reader 12 must be able to at a minimum distinguish between the background and the reflection or luminescence or absorption of the applied wavelength of light by the symbology elements. The difference in density between these two values is a measure of the contrast of the image. The higher the contrast, the easier it is to differentiate the symbology elements of the encodement from the background. But contrast suffers as print quality deteriorates, particularly as the invisible ink in container 40 depletes.

Figure 2:
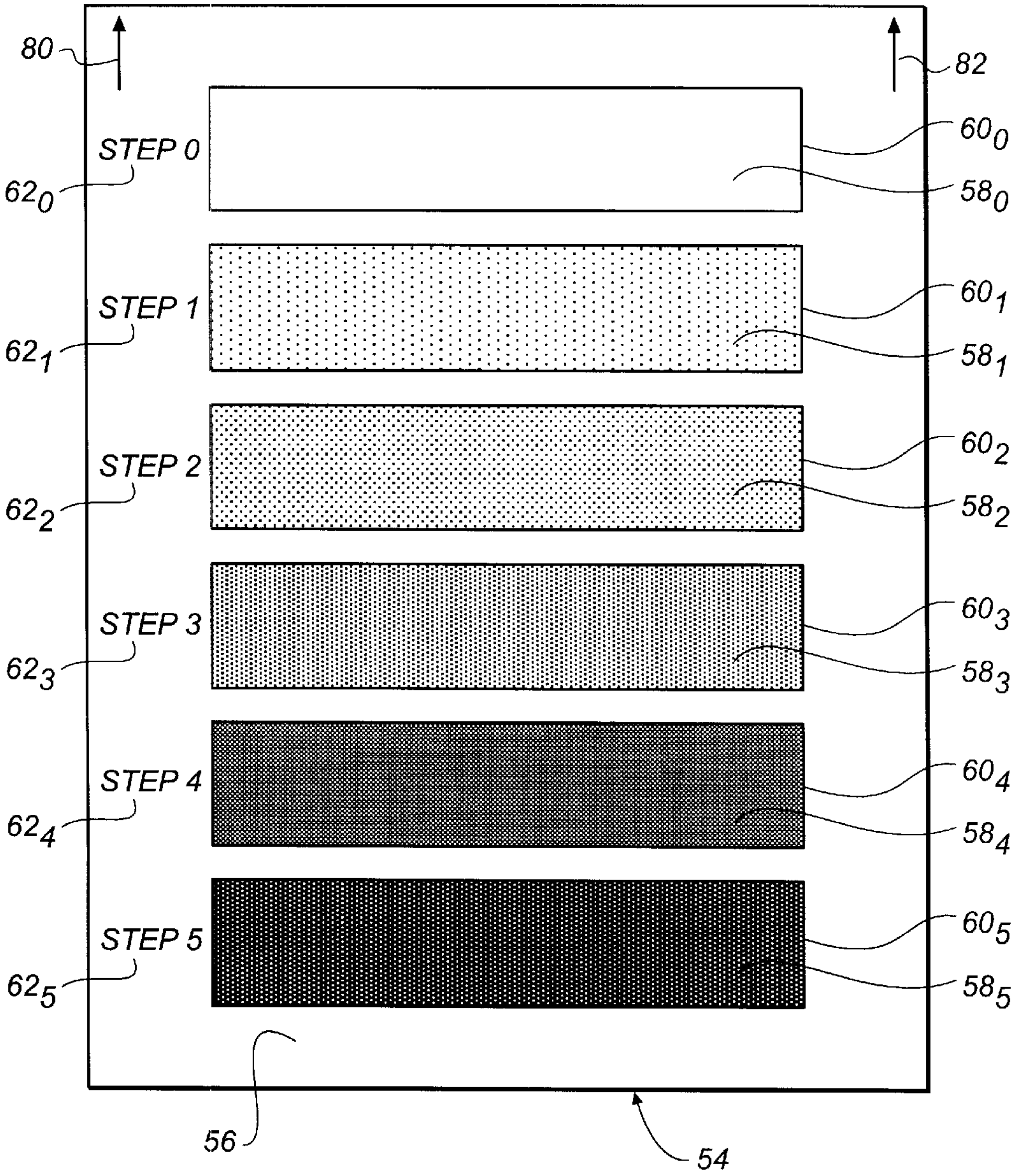
FIG. 2 is a view of a test print media prepared by pre-printing or coating a media surface with an invisible ink that is sensitive to the same wavelength of light as the invisible printer, ink in a test tablet manner.

In a first preferred embodiment of the invention depicted in FIG. 2, a test print media 54 is prepared by pre-printing or coating a media surface 56 with an invisible ink that is sensitive to the same wavelength of light as the printer ink in a test tablet manner. The invisible ink is printed or coated in a plurality N of spaced apart areas with a plurality of invisible ink densities $\mathbf{58}_0$–$\mathbf{58}_N$ of the media surface 56 providing N step background densities. The background densities $\mathbf{58}_0$–$\mathbf{58}_N$ range from no applied ink to maximum printer ink intensity or density in N increments. In FIG. 2, the background densities $\mathbf{58}_0$–$\mathbf{58}_N$ in the spaced apart areas are rendered visible to the eye for convenience of explanation. In practice, these background densities $\mathbf{58}_0$–$\mathbf{58}_N$ are invisible to the eye and are therefore bounded by visible fiducial marks $\mathbf{60}_0$–$\mathbf{60}_N$ comprising points or boundary lines or shaded areas or text, so that each area can be individually imaged and captured by the reader 12. The background step densities $\mathbf{58}_0$–$\mathbf{58}_N$ are also identified visually as "Step 0" through "Step N" by visible step marks or text $\mathbf{62}_0$–$\mathbf{62}_N$. The plurality N is preferably about 5, but may be a greater or lesser number.

Figure 3:
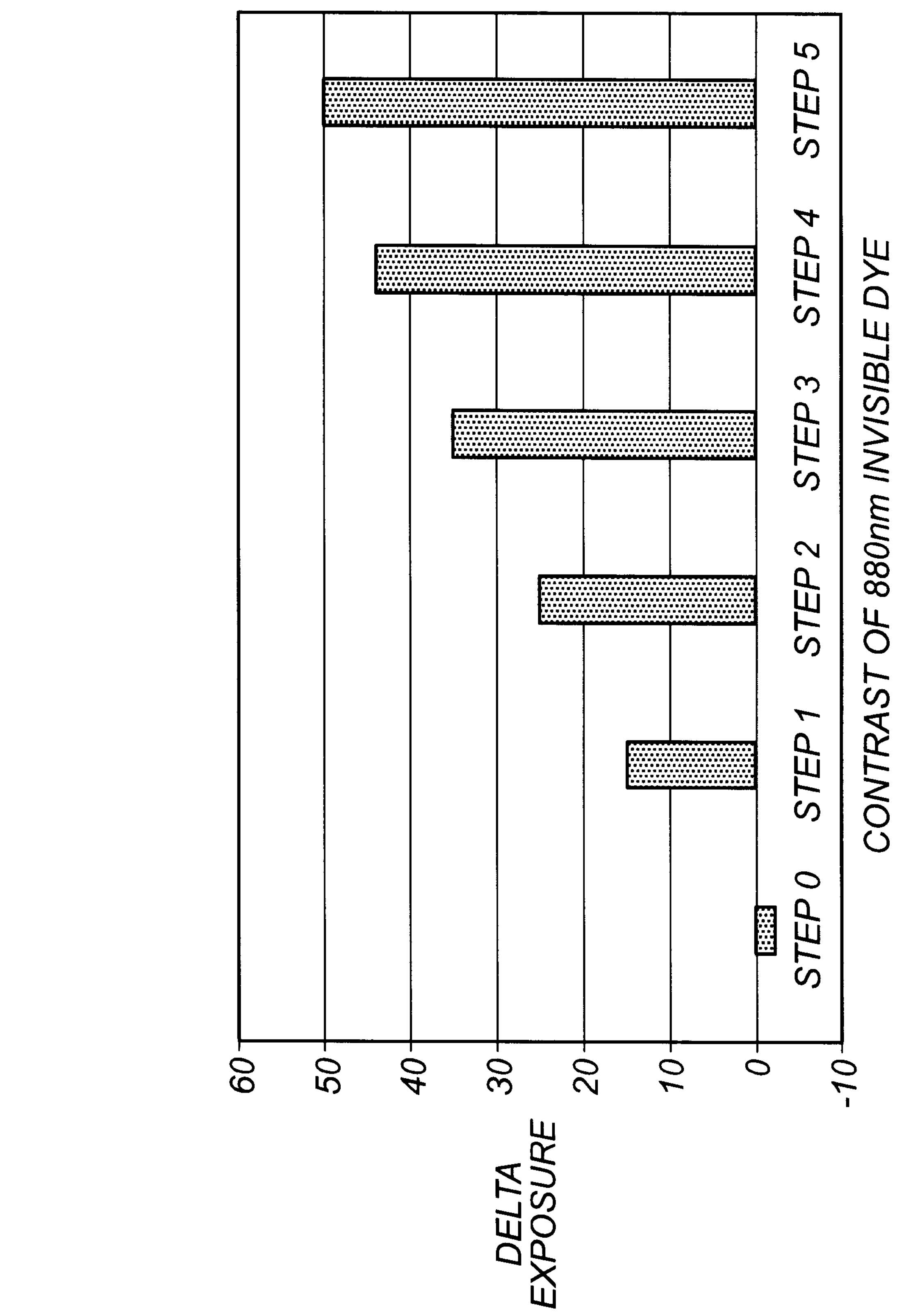
FIG. 3 is a table showing the densities of the step tablet of FIG. 2.

FIG. 3 is a table showing the N densities $\mathbf{58}_0$–$\mathbf{58}_5$ of the step tablet in the spaced apart areas (where N=5) formed of polymethine cyanine 880 nm absorbing dye. The "delta exposure" refers to the digital camera (DCS 460 manufactured by Eastman Kodak Company) numerical output (0–255) for an area within each step of the step tablet when illuminated with a broad band spectral source. Step 0 has no dye and step 5 is at maximal print density or 1000 ppm dye solution laid down as "black" by an HP Deskjet 690 series printer. In practical application, inkjet printing would not be the preferred method for creating the test tablet.

Returning to FIG. 2, the user would then print at the same density a test data encodement on each step and would then test for readability using the hand held reader 12. The format of the test pattern should provide a different message based on which step is being printed in order for the hand held reader 12 to generate a unique message as to the quality of the printed encodement being read from each step.

To accomplish this, the test print media 54 of FIG. 2 is inserted into printer 16 in the direction indicated by arrows 80 and 82, and the test mode is commenced using the computer 14. The printer 16 is operated by computer 14 to print N test data files as N invisible test data encodements $\mathbf{66}_0$–$\mathbf{66}_N$ in the areas of the corresponding N step densities $\mathbf{58}_0$–$\mathbf{58}_N$ of the test print media 54 thereby creating a test target 64 depicted in FIG. 4 that is to be read by the reader 12. All of the N test data encodements $\mathbf{66}_0$–$\mathbf{66}_N$ are printed at the maximum contrast that the ink container 40 and printer 16 are capable of providing. The N test data files are therefore recorded as N test data encodements $\mathbf{66}_0$–$\mathbf{66}_N$ of constant density at the print quality that the printer is capable of providing over the varying background densities $\mathbf{58}_0$–$\mathbf{58}_N$ in the spaced apart areas. Again, the N test data encodements $\mathbf{66}_0$–$\mathbf{66}_N$, like the varying background step densities $\mathbf{58}_0$–$\mathbf{58}_N$, are invisible to the eye, but are shown for convenience of illustration of the concept of the invention in FIG. 3.

Figure 4:
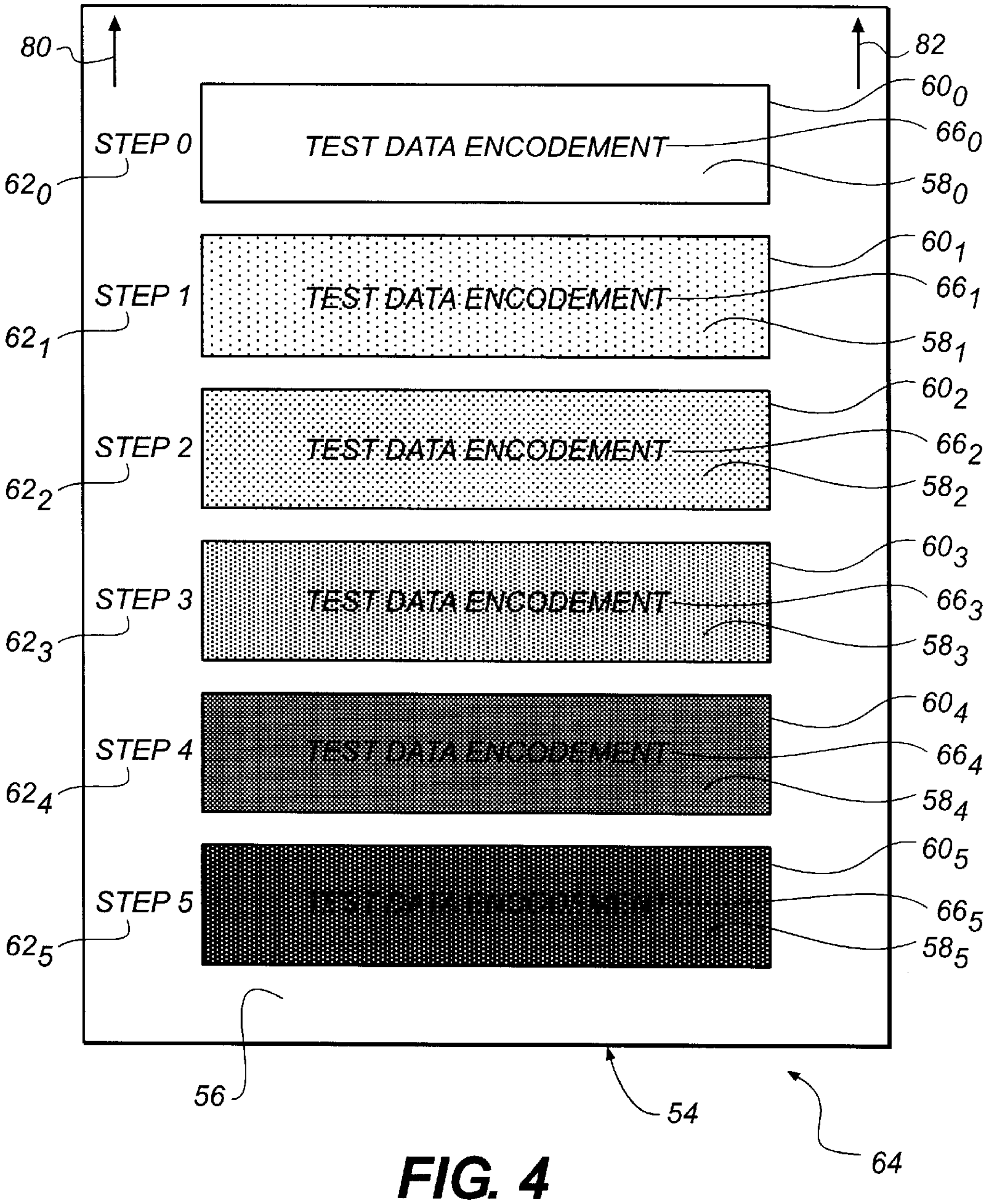
FIG. 4 is a view of a test target comprising N test data files printed as N invisible test data encodements in the corresponding N areas of the test print media of FIG. 3 that is to be read by the reader of FIG. 1.

The test target 64 of FIG. 4 that is created by printer 16 is then captured and read by the user operating the hand held reader 12. Specifically, the N test data encodements $\mathbf{66}_0$–$\mathbf{66}_N$ that are recorded at constant density over the varying background densities $\mathbf{58}_0$–$\mathbf{58}_N$ are simultaneously or sequentially read. The test data files can be read out only if the contrast of the invisible ink printed by the printer 16 used to print the N test data encodements $\mathbf{66}_0$–$\mathbf{66}_N$ exceeds the varying background densities $\mathbf{58}_0$–$\mathbf{58}_N$ by a threshold density difference. The array imager of the reader 12 can detect a certain difference in contrast between the intensity of the invisible ink of an symbology element and the background that it is printed on. If the contrast difference is not great enough, then the printed symbology element cannot be distinguished from the adjoining background, and the encodement will either not be readable or will be inaccurately read.

Because of this difference in contrast, a predetermined number of the encodements at defined locations where the density of the encodement exceeds the step densities by a the threshold amount are readable if the print quality is maximal. The particular ones of the N test data encodements $\mathbf{66}_0$–$\mathbf{66}_N$ that can be accurately decoded provide a measure of the print quality that the printer 16 is capable of achieving using the ink container 40. It is presumed that the print quality that the printer 16 is capable of achieving is degraded if fewer than the predetermined number of encodements are readable. In that case it is recommended that the invisible ink be replenished or the ink container 40 be replaced.

The identification of the particular ones of the N test data encodements $\mathbf{66}_0$–$\mathbf{61}_N$ that can be accurately decoded can be made audibly by voiced statements emitted by the speaker 46. Alternatively, the encodement data files 42 derived from the N test data encodements $\mathbf{66}_0$–$\mathbf{66}_N$ are transmitted to the computer 14 for processing and displaying visually on monitor screen 28 or for printing out by printer 16 in visible print. If all of the N test data encodements $\mathbf{66}_0$–$\mathbf{66}_N$ are simultaneously captured and attempted to be read, then those that can be read are aurally identified or displayed or printed. If the N test data encodements $\mathbf{66}_0$–$\mathbf{66}_N$ printed over the step densities $\mathbf{58}_0$–$\mathbf{58}_N$ are sequentially captured and read by selective use of the hand held reader 12, then those that can be read are aurally identified or displayed or printed and the others are identified by an error signal. The test data encodements 66$_0$–66$_N$ can contain the same message as conveyed by the visible text 62$_0$–62$_N$.

Figure 5:
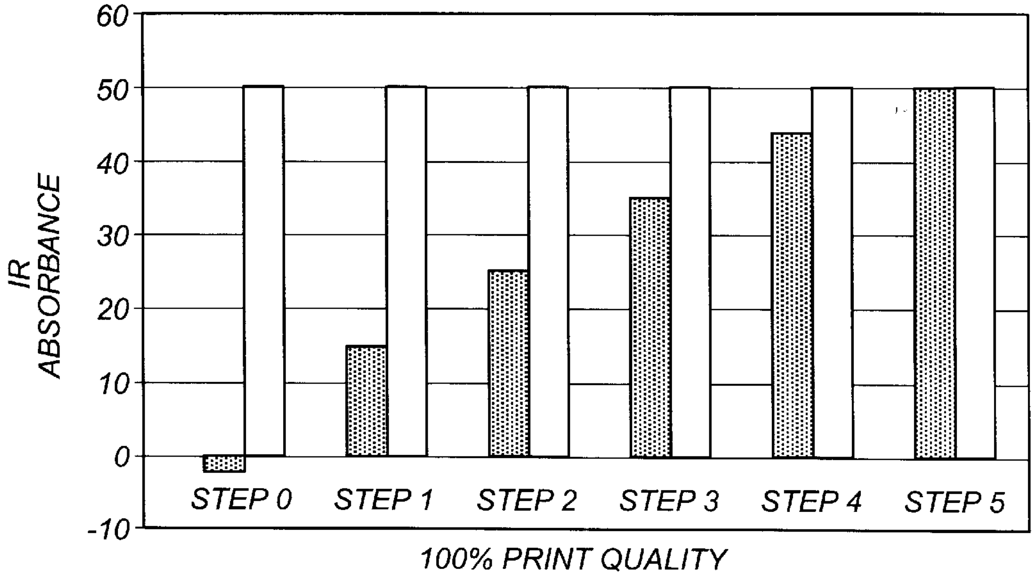
FIG. 5 is a table illustrating the comparison of the constant density of the N test data encodements (where N=5 in this case) with respect to the varying background densities of the spaced apart areas, where the print quality is at maximal print quality.

FIG. 5 illustrates the comparison of the constant density of the N test data encodements 66$_0$–66$_5$ (where N=5 in this case) with respect to the varying background densities 58$_0$–58$_5$ where the print quality is maximal. In this illustration, the printer 16 is operating at maximum density providing the highest quality printing of the invisible encodements. The background density 58$_0$ is effectively "zero" providing the maximum possible contrast with the test data encodement printed over it. The background density 585 is equal to or exceeds the maximum element density that can be generated by the printer 16 in printing the test encodement elements, resulting in minimal or no contrast. With these two extremes, it is assured that the ability of the reader 12 to read the test encodements will provide an indication of print quality that the printer is capable of attaining.

Figure 6:
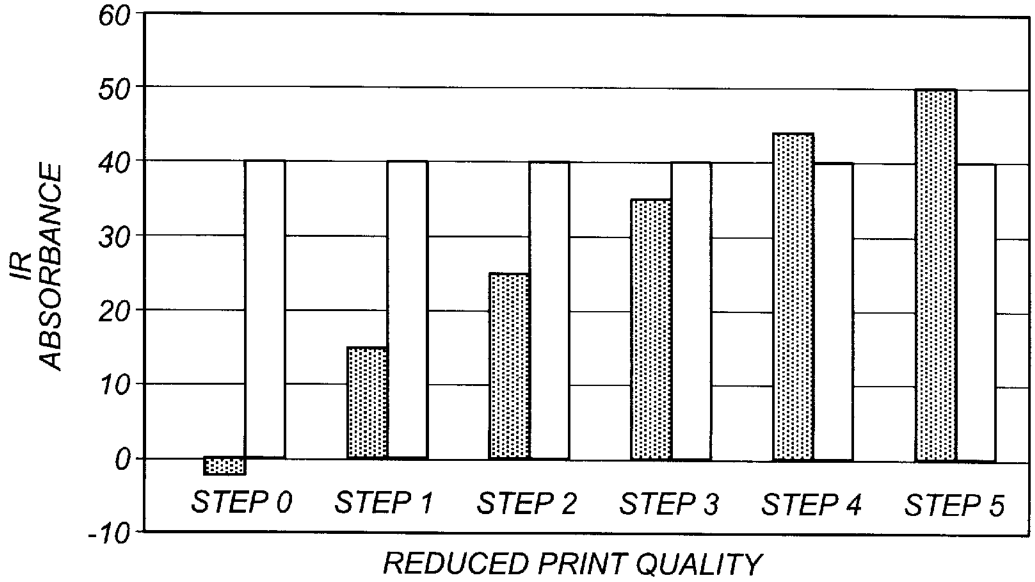
FIG. 6 is a table illustrating the comparison of the constant density of the N test data encodements (where N=5 in this case) with respect to the varying background densities of the spaced apart areas, where the print quality is reduced from maximal print quality.

In this particular case of FIG. 5, the print densities of the test data encodements 66$_0$, 66$_1$, 66$_2$, 66$_3$, and 66$_4$ exceed the corresponding background densities 58$_0$, 58$_1$, 58$_2$, 58$_3$, and 58$_4$, by a sufficient margin such that they can be readily resolved. However, when the print density capability of the ink container 40 and/or printer 16 deteriorates or fades as shown in FIG. 6, then only the test data encodements 66$_0$, 66$_1$, and 66$_2$ (for example) exceed the corresponding background densities 58$_0$, 58$_1$, and 58$_2$, by a sufficient margin such that they can be readily resolved. The user is advised of the print quality accordingly by the messages that are readable from at least certain ones of the test data encodements, which may be audibly voiced by the reader or displayed by the monitor screen in the system of FIG. 1.

Figure 7:
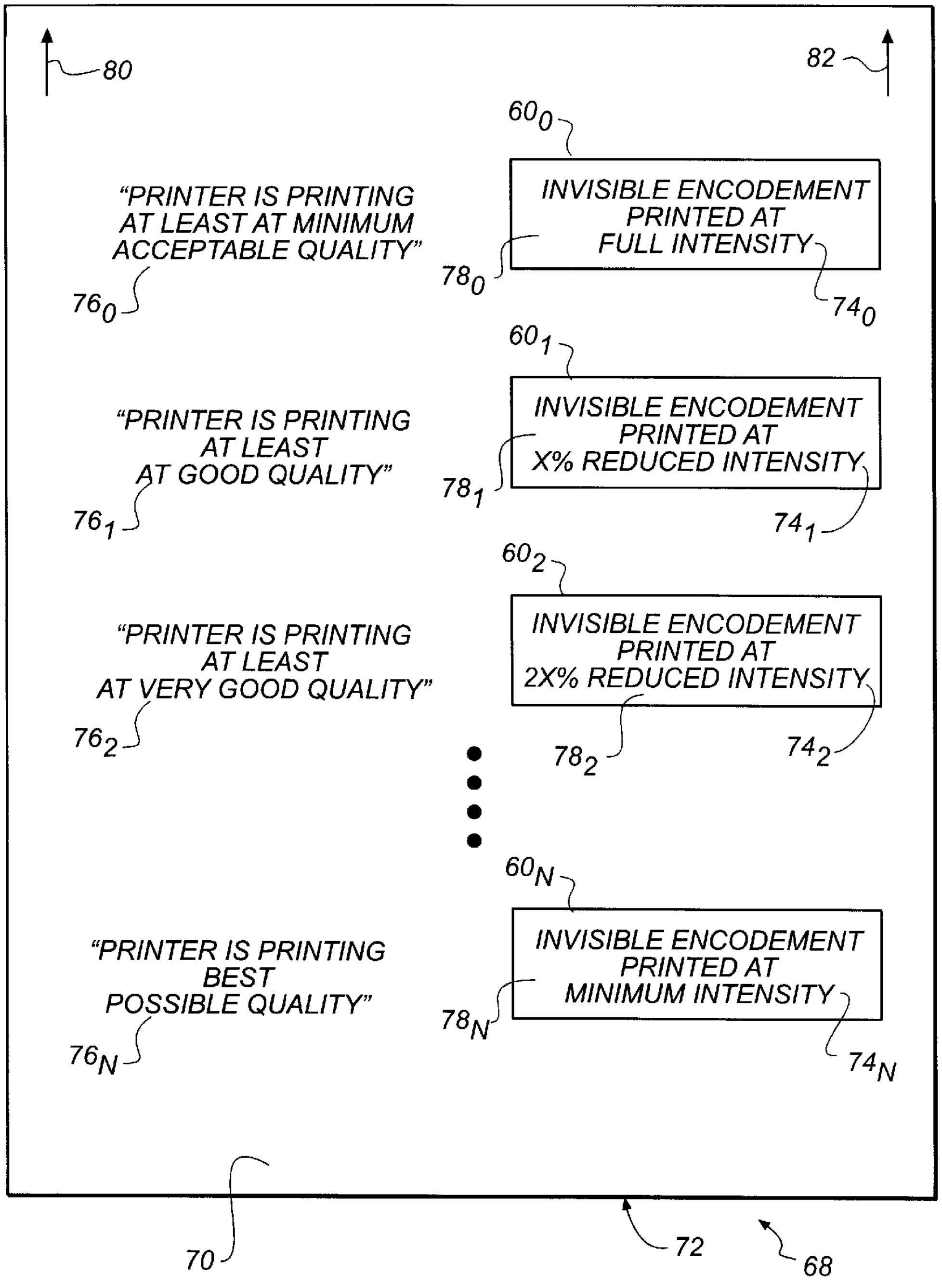
FIG. 7 is a view of a test target formed of a test print media comprising a plurality of test data encodements differing from one another in intensity a step tablet manner printed by the printer operating in a test mode under the control of the computer in the system of FIG. 1.
Figure 8:
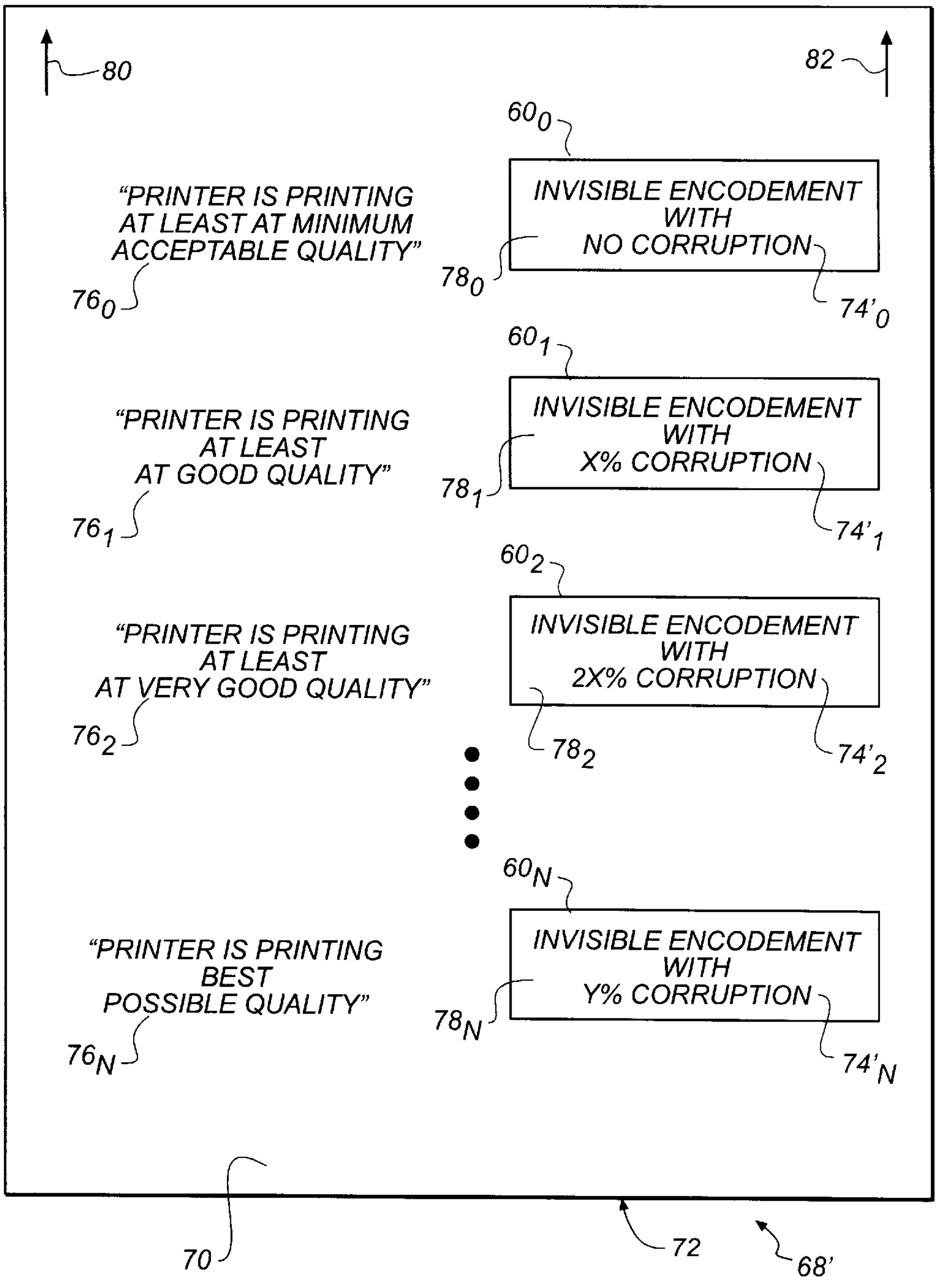
FIG. 8 is a view of a test target formed of a test print media comprising a plurality of test data encodements differing from one another by artificially introduced corruption levels in a further step tablet manner printed by the printer operating in a test mode under the control of the computer in the system of FIG. 1.
Figure 9:
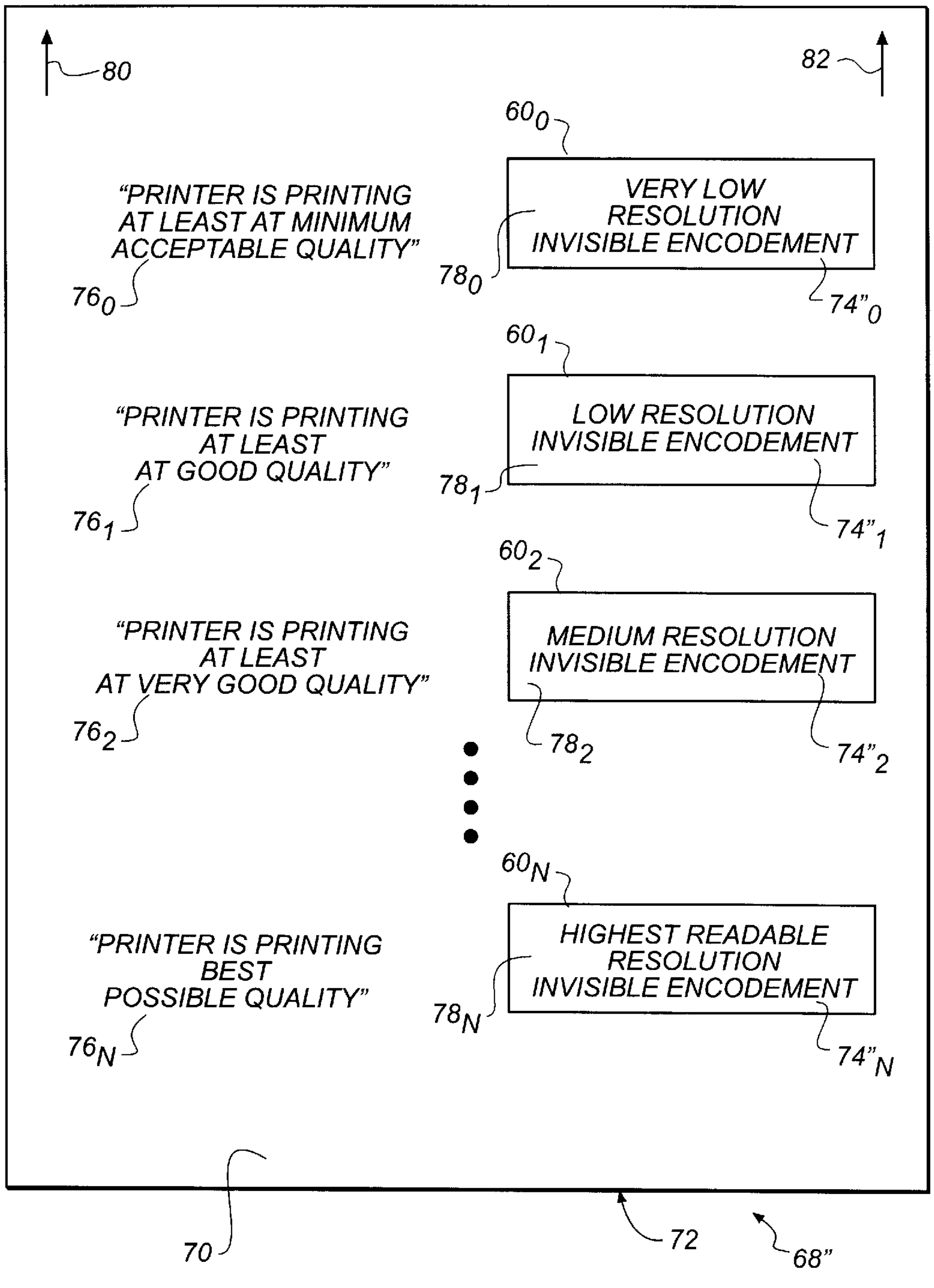
FIG. 9 is a view of a test target formed of a test print media comprising a plurality of test data encodements differing from one another by artificially introduced resolution levels in a further step tablet manner printed by the printer operating in a test mode under the control of the computer in the system of FIG. 1.

In a second preferred embodiment, a test target 68, 68' or 68", depicted in FIGS. 7–9, is printed by the printer 16 operating in a test mode under the control of the computer 14. A plurality of test data encodements 74$_0$–74$_N$ (or 74'$_0$–74'$_N$ or 74"$_0$–74"$_N$) are printed in N spaced apart areas 78$_0$–78$_N$ by printer 16 using the ink container 40 on a sheet surface 70 of a plain paper sheet 72 (or over visible images that can be sacrificed). The print quality of each of the test data encodements 74$_0$–74$_N$ differ from one another in a step tablet manner analogous to the steps of FIG. 3. In this embodiment, the background absorbency of the emitted light in the spaced apart areas 78$_0$–78$_N$ remains constant, whereas the degree of absorbency or the quality of the encodements 74$_0$–74$_N$ is altered in a step fashion. The test data files can be read out only if the contrast of the invisible ink printed by the printer 16 used to print the N test data encodements 74$_0$–74$_N$ exceeds the constant sheet surface background in the spaced apart areas 78$_0$–78$_N$ by a threshold density difference of sufficient margin as described above.

Because of this difference in contrast or quality, a predetermined number of test data encodements 74$_0$–74$_N$ in the spaced apart areas 78$_0$–78$_N$ can be read by the hand held reader 12 and others cannot be read. Each of the plurality of test data encodements 74$_0$–74$_N$ is read and decoded to the extent possible using the hand held reader 12 as described above with reference to the first embodiment. The particular ones of the plurality of test data encodements 74$_0$–74$_N$ that can be accurately decoded provide a measure of the print quality that the printer 16 is capable of achieving using the ink container 40. The invisible test data encodements 74$_0$–74$_N$ that are readable are decoded and can provide unique messages to the user indicating the print quality and suggesting whether or not the ink container 40 should be replaced.

In the variations of this embodiment, the test target 68 is largely invisible after it is printed. So the sheet surface 70 is also imprinted with visible text or indicia 76$_0$–76$_N$ signifying the locations or areas 78$_0$–78$_N$ where the N invisible test data encodements 74$_0$–74$_N$ are printed. The visible text or indicia 78$_0$–78$_N$ may optionally include the text which is voiced by the hand held reader 12 or are displayed on monitor screen 28 if the hand held reader 12 can decode the corresponding test data encodements 74$_0$–74$_N$. The visible text or indicia 78$_0$–78$_N$ can be printed in the same locations or areas 78$_0$–78$_N$ where the N invisible test data encodements 74$_0$–74$_N$ are printed because the former cannot be read by the hand held reader 12 and the latter are invisible to the user. The visible fiducial marks 60$_0$–60$_N$, e.g., border lines around spaced apart areas 78$_0$–78$_N$, can also be printed by printer 16. The printer 16 can be operated to print both, using the visible ink container(not shown) and the invisible ink container 40

In one variation of this embodiment depicted in FIG. 7, a series of test data files are printed with varying degrees of symbology element intensity or density of applied invisible ink by a gray scale print mode program installed in the computer 14 controlling the printer 16. In the test mode, the test data files are thereby printed as a plurality of progressively degraded or more faded invisible test data encodements 74$_0$–74$_N$ at a N corresponding separated discrete areas 78$_0$–78$_N$ on the sheet surface 70 thereby creating a test target 68 that is to be read by the reader 12.

At maximum attainable print quality, a predetermined number of the N invisible test data encodements 74$_0$–74$_N$ at corresponding separated areas 78$_0$–78$_N$ are readable due to their absorbency in comparison to the sheet surface absorbency despite the imposed stepwise degradation of print quality. But, additional physical corruption of the encodements occurs if print quality is reduced from maximum attainable print quality, e.g., by fading or skipping of the invisible ink or smearing or the like. Again, it is presumed that the print quality that the printer 16 is capable of achieving is degraded if fewer than the predetermined number of the invisible test data encodements 74$_0$–74$_N$ are readable or predetermined ones of the encodement are not readable.

In a further variation of this embodiment illustrated in FIG. 8, during the test mode, a series of test data files are created with varying amounts of corrupted data by a test program installed in the computer 14 controlling the printer 16. The test data files are printed as a plurality of invisible test data encodements 74'$_0$–74'$_N$ at a corresponding plurality of discrete locations 78$_0$–78$_N$ of the sheet surface 72 thereby creating a test target 68' that is to be read by the reader 12. Degradation can be achieved by selectively reducing the degree of redundancy that is normally employed by the symbology encoding software in encoding data into the encodements 74'$_0$–74'$_N$. In FIG. 8, various values of "X" and the proper value of "Y" are determined by the amount of error correction built into the code and the reader's calculation/decoding capability. The absolute capability of the system is represented by "Y", and by using various values of "X", it is possible to create a test target 68 in which the tolerable threshold for bit errors in the reading of the test file is changed.

A predetermined number of the invisible test data encodements 74'$_0$–74'$_N$ at defined locations are readable despite the imposed corruption as long as print quality is at the maximum attainable print quality of the printer. But, additional physical corruption of the invisible test data encodements 74'$_0$–74'$_N$ occurs if print quality is degraded from maximum. Then, if fewer than the predetermined number of invisible test data encodements 74'$_0$–74'$_N$ are readable, it is presumed that the print quality that the printer 16 is capable of achieving is degraded from maximal print quality.

In a still further variation of this embodiment illustrated in FIG. 9, during the test mode, a series of test data files are created for printing at differing size resolution by a test program installed in the computer 14 controlling the printer 16. The test data files are printed as a plurality of invisible test data encodements 74"$_0$–74"$_N$ at the corresponding plurality of discrete locations 78$_0$–78$_N$ of the sheet surface 72 thereby creating a test target 68" that is to be read by the reader 12. Degradation can be achieved by selectively increasing the resolution (and thus decreasing the target pixel size) that is normally employed by the symbology encoding software in encoding data into the encodements 74"$_0$–74"$_N$. Resolution increases from a minimum resolution of invisible test data encodement 74"$_0$ to the maximum readable resolution of invisible test data encodement 74"$_N$.

A predetermined number of the invisible test data encodements 74"$_0$–74"$_N$ at defined locations are readable despite the high resolution target as long as print quality is at the maximum attainable print quality of the printer 16. Additional physical corruption of the invisible test data encodements 74"$_0$–74"$_N$ occurs if print quality is degraded from maximum print quality. Then, if fewer than the predetermined number of invisible test data encodements 74"$_0$–74"$_N$ are readable, it is presumed that the print quality that the printer 16 is capable of achieving is degraded from maximal print quality.

The present invention has particular utility in testing the printing function of invisible inks employed to print relatively large scale and data in invisible encodements printed using two-dimensional symbologies. The present invention can also be employed in testing the printing quality of simple one-dimensional bar codes printed in invisible ink.

The invention has been described in detail with particular reference to certain preferred embodiments thereof, but it will be understood that variations and modifications can be effected within the spirit and scope of the invention.

What is claimed is:

1. A method of forming a test target for use in conducting a test of print quality of a printer printing invisible encodements in invisible ink that can be captured and decoded by a reader, the method comprising the steps of:

providing a test print media to the printer under test; and printing a plurality of invisible encodements of test data over a surface of the test print media in a defined spatial order by the printer, wherein the printed encodements differ from one another, and print quality of the printer is determined by the ability of the reader to read and decoded at least certain ones of the plurality of invisible encodements;

wherein:

the providing step further comprises the step of:

applying invisible material that is sensitive to the same wavelength of light as the invisible ink of the printer to the media surface in a plurality of densities in a plurality of spaced apart areas of the media surface, thereby providing step background densities in a test tablet manner, and the printing step further comprises the step of:

operating the printer to print the plurality of invisible encodements of test data in the plurality of spaced apart areas of the media surface over the applied invisible materials.

2. The method of claim 1, further comprising the step of providing visible fiducial marks on the media surface locating the plurality of spaced apart areas of the media surface for reading by the reader.

3. The method of claim 1, further comprising the step of providing visible text of the invisible encodements visibly printed or contained on the test target.

4. The method of claim 1, further comprising the step of providing visible fiducial marks locating the plurality of spaced apart areas of the media surface for reading by the reader.

5. The method of claim 1, further comprising the step of providing visible text of the invisible encodements visibly printed or contained on the test target.

6. The method of claim 1, wherein the invisible encodements are encoded with messages that when read by a reader express the state of the print quality of the printer.

7. The method of claim 1, wherein the reader is capable of translating the read encodements into audible statements understandable by the user, and the invisible encodements are encoded with audible messages that when read by a reader express the state of the print quality of the printer.

8. The method of claim 1, wherein the printing step further comprises the step of printing the plurality of encodements differing from one another in a step tablet manner on the surface of the media by the printer under test.

9. The method of claim 8, wherein the printing step further comprises the step of printing the plurality of encodements in differing densities of the invisible ink printed by the printer, whereby the print quality of the printer is determined by the ability of the reader to decode ones of the plurality of invisible encodements having reduced density.

10. The method of claim 8, wherein the encodements following a predetermined symbology, and the printing step further comprises the step of differentially printing the plurality of encodements with introduced degrees of corruption of the encodement symbology, whereby the print quality of the printer is determined by the ability of the reader to decode ones of the plurality of invisible encodements having introduced corruption.

11. The method of claim 8, wherein the encodements following a predetermined symbology, and the printing step further comprises the step of differentially printing the symbology elements of the plurality of encodements with reduced degrees of resolution, whereby the print quality of the printer is determined by the ability of the reader to decode ones of the plurality of invisible encodements having reduced resolution.

12. A method testing a printer printing invisible encodements in invisible ink that can be captured and decoded by a reader for print quality of the invisible ink comprising the steps of:

providing a test print media to the printer under test;

printing a plurality of invisible encodements of test data over a surface of the test print media in a defined spatial order by the printer, said printing of said invisible encodements differing from one said encodement to another wherein the printed encodements differ from one another in contrast in a step tablet manner when subject to a particular wavelength of light; and imaging the invisible encodements with light of said wavelength, by a reader for reading and decoding each of the invisible encodements; and determining print quality of the printer by the ability of tile reader to read and decode at least certain ones of the plurality of invisible encodements.

13. The method of claim 12, wherein the invisible encodements are encoded with messages that when read by a reader express the state of the print quality of the printer.

14. The method of claim 12, wherein the reader is capable of translating the read encodements into audible statements understandable by the user, and the invisible encodements are encoded with audible messages that when read by a reader express the state of the print quality of the printer.

15. The method of claim 12, further comprising the step of providing visible fiducial marks on the media surface locating the plurality of spaced apart areas of the media surface for reading by the reader, and the imaging step further comprises the step of employing the fiducial marks to image the invisible encodements by the reader.

16. The method of claim 12, further comprising the step of providing visible text of the invisible encodements visibly printed or contained on the test target.

17. The method of claim 12, wherein the printing step further comprises the step of printing the plurality of encodements differing from one another in a step tablet manner on the surface of the media by the printer under test.

18. The method of claim 17, wherein the printing step further comprises the step of printing the plurality of encodements in differing densities of the invisible ink printed by the printer, whereby the print quality of the printer is determined by the ability of the reader to decode ones of the plurality of invisible encodements having reduced density during the reading step.

19. The method of claim 17, wherein the encodements following a predetermined symbology, and the printing step further comprises the step of differentially printing the plurality of encodements with introduced degrees of corruption of the encodement symbology, whereby the print quality of the printer is determined by the ability of the reader to decode ones of the plurality of invisible encodements having introduced corruption during the reading step.

20. The method of claim 17, wherein the encodements following a predetermined symbology, and the printing step further comprises the step of differentially printing the symbology elements of the plurality of encodements with reduced degrees of resolution, whereby the print quality of the printer is determined by the ability of the reader to decode ones of the plurality of invisible encodements having reduced resolution.

21. A method testing a printer printing invisible encodements in invisible ink that can be captured and decoded by a reader for print quality of the invisible ink comprising the steps of:

providing a test print media to the printer under test;

printing a plurality of invisible encodements of test data over a surface of the test print media in a defined spatial order by the printer, wherein the printed encodements differ from one another; and imaging the invisible encodements by a reader for reading and decoding each of the invisible encodements; and determining print quality of the printer by the ability of the reader to read and decode at least certain ones of the plurality of invisible encodements;

wherein:

the providing step further comprises the step of:

applying invisible material that is sensitive to the same wavelength of light as the invisible ink of the printer to the media surface in a plurality of densities in a plurality of spaced apart areas of the media surface, thereby providing step background densities in a test tablet manner; and the printing step further comprises the step of:

operating the printer to print the plurality of invisible encodements of test data in the plurality of spaced apart areas of the media she over the applied invisible materials.

22. The method of claim 21, further comprising the step of providing visible fiducial marks on the media surface locating the plurality of spaced apart areas of the media surface for reading by the reader, and the imaging step further comprises the step of employing the fiducial marks to image the invisible encodements by the reader.

23. The method of claim 21, further comprising the step of providing visible text of the invisible encodements visibly printed or contained on the test target.

24. A test target used with a printer printing invisible encodements in invisible ink that can be captured and decoded by a reader, said invisible encodements being sensitive to a particular wavelength of light, the test target comprising:

test print media having a surface, said surface bearing invisible material that is sensitive to said wavelength of light, said material being disposed on said surface in a plurality of densities in a plurality of different areas of the media surface, thereby providing step background densities in a test tablet manner; and a plurality of invisible encodements printed by said printer, said invisible encodements being disposed over said surface of said test print media in a defined spatial order, whereby the print quality of the printer is capable of being determined by the ability of the reader to read and decode at least certain ones of the plurality of invisible encodements.

25. The test target of claim 24, further comprising visible fiducial marks locating the plurality of areas of the media surface for reading by the reader.

26. The test target of claim 24, further comprising visible text of the invisible encodements visibly printed or contained on the test target.

27. The test target of claim 24, wherein the invisible encodements are encoded with messages that when read by a reader express the state of the print quality of the printer.

28. The test target of claim 24, wherein the reader is capable of translating the read encodements into audible statements understandable by the user, and the invisible encodements are encoded with audible messages that when read by a reader express the state of the print quality of the printer.

29. The test target of claim 24, further comprising visible fiducial marks locating the plurality of spaced apart areas of the media surface for reading by the reader.

30. The test target of claim 24, further comprising visible text of the invisible encodements visibly printed or contained on the test target.

31. The test target of claim 24, wherein said areas of said media surface in which said invisible material is disposed, are spaced apart; and said encodements are disposed in respective said spaced apart areas of said media surface.

32. A test target used with a printer printing invisible encodements in invisible ink that can be captured and decoded by a reader, said invisible encodements being sensitive to a particular wavelength of light, the test target comprising:

test print media having a surface, said surface bearing invisible material that is sensitive to said wavelength of light, said material being disposed on said surface in a uniform density in a plurality of different areas of the media surface; and a plurality of invisible encodements printed by said printer, said invisible encodements being disposed on said surface of said test print media in a defined spatial order over said invisible material, said invisible encodements differing from each other in contrast when subject to said wavelength of light;

whereby the print quality of the printer is capable of being determined by the ability of the reader to read and decode at least certain ones of the plurality of invisible encodements.

33. The test target of claim 32, wherein the plurality of encodements differ from one another in density, whereby the print quality of the printer is determined by the ability of the reader to decode ones of the plurality of invisible encodements having reduced density.

34. The test target of claim 32, wherein the encodements follow a predetermined symbology and differ in degree of introduced corruption of the encodement symbology, whereby the print quality of the printer is determined by the ability of the reader to decode ones of the plurality of invisible encodements having introduced corruption.

35. The test target of claim 32, wherein the encodements follow a predetermined symbology and differ in degree of resolution of the encodemnent symbology elements, whereby the print quality of the printer is determined by the ability of the reader to decode ones of the plurality of invisible encodements having increased resolution.

36. A test target used with a printer printing invisible encodements in invisible ink that can be captured and decoded by a reader, said invisible encodements being sensitive to a particular wavelength of light, the test target comprising:

test print media having a surface, said surface bearing invisible material that is sensitive to said wavelength of light, said material being disposed on said surface in a plurality of different areas of the media surface; and a plurality of invisible encodements disposed on said invisible material in respective said areas;

wherein one of said invisible material and said invisible encodements differs in contrast in said different areas in a test tablet manner;

whereby the print quality of the printer is capable of being determined by the ability of the reader to read and decode at least certain ones of the plurality of invisible encodements.

37. The method of claim 36 wherein one of said invisible material and said invisible encodements differs in density in said different areas.

* * * * *

UNITED STATES PATENT AND TRADEMARK OFFICE

CERTIFICATE OF CORRECTION

PATENT NO. : 6,542,622 B1
DATED : April 1, 2003
INVENTOR(S) : David J. Nelson et al.

It is certified that error appears in the above-identified patent and that said Letters Patent is hereby corrected as shown below:

Column 13,
Line 51, delete "decoded" and insert -- decode --

Column 14,
Line 63, delete "tile" and insert -- the --

Signed and Sealed this

Seventeenth Day of June, 2003

JAMES E. ROGAN
*Director of the United States Patent and Trademark Office*